(12) United States Patent
Ho et al.

(10) Patent No.: US 10,845,569 B2
(45) Date of Patent: Nov. 24, 2020

(54) CAMERA MODULE

(71) Applicant: SAE Magnetics (H.K.) Ltd., Hong Kong (CN)

(72) Inventors: Yiu Sing Ho, Hong Kong (CN); Shou Sheng Gao, GuangDong (CN); Zong Qin Shi, GuangDong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 171 days.

(21) Appl. No.: 16/051,771

(22) Filed: Aug. 1, 2018

(65) Prior Publication Data

US 2019/0079263 A1    Mar. 14, 2019

(30) Foreign Application Priority Data

Sep. 11, 2017 (CN) .................. 2017 2 1163425 U

(51) Int. Cl.
| | | |
|---|---|---|
| *G02B 7/10* | (2006.01) | |
| *G02B 7/28* | (2006.01) | |
| *H04N 5/225* | (2006.01) | |
| *H02K 41/00* | (2006.01) | |
| *G02B 7/08* | (2006.01) | |
| *H02K 41/035* | (2006.01) | |

(52) U.S. Cl.
CPC .............. *G02B 7/102* (2013.01); *G02B 7/08* (2013.01); *G02B 7/282* (2013.01); *H02K 41/00* (2013.01); *H02K 41/0356* (2013.01); *H04N 5/2253* (2013.01); *H04N 5/2254* (2013.01)

(58) Field of Classification Search
CPC ....... G02B 7/102; G02B 7/282; H04N 5/2254
See application file for complete search history.

(56) References Cited

U.S. PATENT DOCUMENTS

2017/0038600 A1*  2/2017  Hee ..................... G02B 27/646

* cited by examiner

*Primary Examiner* — Jack Dinh
(74) *Attorney, Agent, or Firm* — Nixon & Vanderhye PC

(57) ABSTRACT

Disclosed is a camera module that comprises a lens assembly that includes a lens base and a lens tube integrated with the lens base for receiving at least one lens; and a voice coil motor assembly for driving the lens assembly, comprising a base, two leaf springs, at least two coils, and at least two magnets. The coils are respectively fixed on two opposite sides of the base, the magnets are fixed on two opposite sides of the lens assembly respectively, and the magnets are located by inner sides of the coils respectively, the lens assembly is clamped by the leaf springs and supported on the base, the coils drive the magnets and the lens assembly to move after being energized. The camera module is simply structured, easy to assembly, less bulky and fit for the demand of thin products.

10 Claims, 7 Drawing Sheets

CAMERA MODULE

This application claims priority to CN Patent Application No. 201721163425.X filed Sep. 11, 2017, the entire contents of which are hereby incorporated by reference.

FIELD OF THE INVENTION

The present invention relates to a camera module, in particular, to a camera module comprising a lens assembly and a voice coil motor.

BACKGROUND OF THE INVENTION

Voice coil motors are fit for actuators of electronic products (such as digital cameras, mobile phones, digital videos) because of the advantages of small size, less power usage and low price.

As shown in FIG. 1, a common voice coil motor 1' comprises a housing 10', a base 20', a movable assembly 30', four magnets 40' arranged around the movable assembly 30', a support 41' located on the housing for supporting the magnets 40', an upper leaf spring 50' and an lower leaf spring 60' relatively arranged on the upper and lower surfaces of the movable assembly 30', wherein the housing 10' and the base 20' form an accommodating chamber 12', the movable assembly 30' and the coil 34' are movably arranged in the accommodating chamber 12'. When assembling the voice coil motor 1', the support 41' and the lower leaf spring 60' are disposed in the housing 10', four magnets 40' are respectively arranged on four inner sides of the housing 10', the upper and lower surface of the upper leaf spring 50' are fixedly connected to the top surface of the housing 10' and the magnets 40' respectively under the force of the lower leaf spring 60', the movable assembly 30' is arranged between the upper and lower leaf springs 50', 60', the lower leaf spring 60' is fixedly connected to the base 20' and finally the housing 10' is fixed onto the base 20', in this way, the assembly of the voice coil motor is accomplished. Wherein, the movable assembly 30' includes a lens carrier 32' and a coil 34' winding around the lateral surfaces of the lens carrier 32', the lens carrier 32' is configured for receiving components such as a lens tube, a focus lens group or a zoom lens group. The upper and lower leaf springs 50', 60' can protect the lens tube, the focus lens group or a zoom lens group and so on. When the coil 34' in the movable assembly 30' is energized, magnetic force is generated between the coil 34' and the fixed magnets 40' so that the movable assembly 30' moves in the accommodation chamber 12' so as to change the distance between the lens tube, the focus lens group or a zoom lens group and the camera sensor, and thereby focusing and zooming can be realized. Above is the moving-coil-type voice coil motor.

However, the structure of this type of voice coil motor is so complexed and the components are so many that the assembly procedure thereof is very complicated and time-consuming. Moreover, the coil 34' is arranged around the lens base 32' and the magnets 40' are located on the external sides if the coil 34', it causes the increase of the width and size of the voice coil motor and renders it unsuitable for the demand of thin products.

Therefore, a camera module with a developed voice coil motor is desired to overcome the preceding disadvantages.

SUMMARY OF THE INVENTION

The present invention aims to provide a camera module that is simply structured, easy to assembly, less bulky and fit for the demand of thin products.

In order to realize the above mentioned aim, the camera module according to the present invention comprises:

a lens assembly that includes a lens base and a lens tube integrated with the lens base for receiving at least one lens; and a voice coil motor assembly for driving the lens assembly, comprising a base, an upper leaf spring, an lower leaf spring, at least a first coil and a second coil, and at least a first magnet and a second magnet;

the first and second coils are respectively fixed on two opposite sides of the base, the first and second magnets are fixed on two opposite sides of the lens assembly respectively, and the first and second magnets are located by inner sides of the first and second coils respectively, the lens assembly is clamped by the upper and lower leaf springs and supported on the base, the first and second coils drive the first and second magnets and the lens assembly to move after being energized.

Comparing with the prior art, the assembling processes of the lens base and the lens tube is simplified by arranging them in an integral structure. Moreover, the camera module utilizes the moving magnet driving mode where the magnets are fixed on the lens assembly, the coils are fixed on the base, and the magnets are located by the inner sides of the coils, the energized coils drive the magnets and the lens assembly to move. In this structure, the number of components is lessened and the assembly thereof is facilitated, besides, the number of portions need to weld is reduced and thereby the welding space is saved and the product is further downsized, which acclimates the trend of thin products.

Preferably, a plurality of fixed columns protrude from an surface of the base, each of the coils bridges over the two fixed columns and is located at the outer side of the fixed columns.

Preferably, magnet accommodating portions are configured on the two opposite outer sides of the lens base for accommodating the magnets respectively, an accommodating room is formed between the two fixed columns on each of the opposite sides of the lens base, the magnet located on the same side is accommodated in the magnet accommodating portion and adjacent to the coil on the side.

Preferably, an first end of the first coil is connected to an first end of the second coil via a wire, a groove is disposed on the base, the wire is embedded in the groove of the base; an second end of the first coil and an second end of the second coil are welded to lateral surfaces of pins of the fixed columns.

Preferably, the second end of the first coil and the second end of the second coil are welded on the lateral surfaces of the fixed columns via the pins and one end of each one of the pins protrudes through the base outwardly.

Preferably, a protrusion is disposed on each of the fixed columns, the upper leaf spring is arranged on an upper surface of the lens assembly and connected to the protrusions, and the upper leaf spring lies on the upper surfaces of the magnets partly.

Preferably, the lower leaf spring is arranged on an upper surface of the base.

Preferably, a step portion and a sunken portion are formed on the base and the fixed columns are secured on the step portion.

Preferably, the step portion and the sunken portion are formed on the base, the fixed columns are secured on the step portion, and the groove is disposed on the sunken portion.

Preferably, the camera module further comprises a housing that covers the lens assembly and the voice coil motor assembly.

The present invention will be clearer by referring the following description and drawings for illustrating the embodiments of the present invention.

DESCRIPTION OF THE PREFERRED EMBODIMENTS

Figure 1:
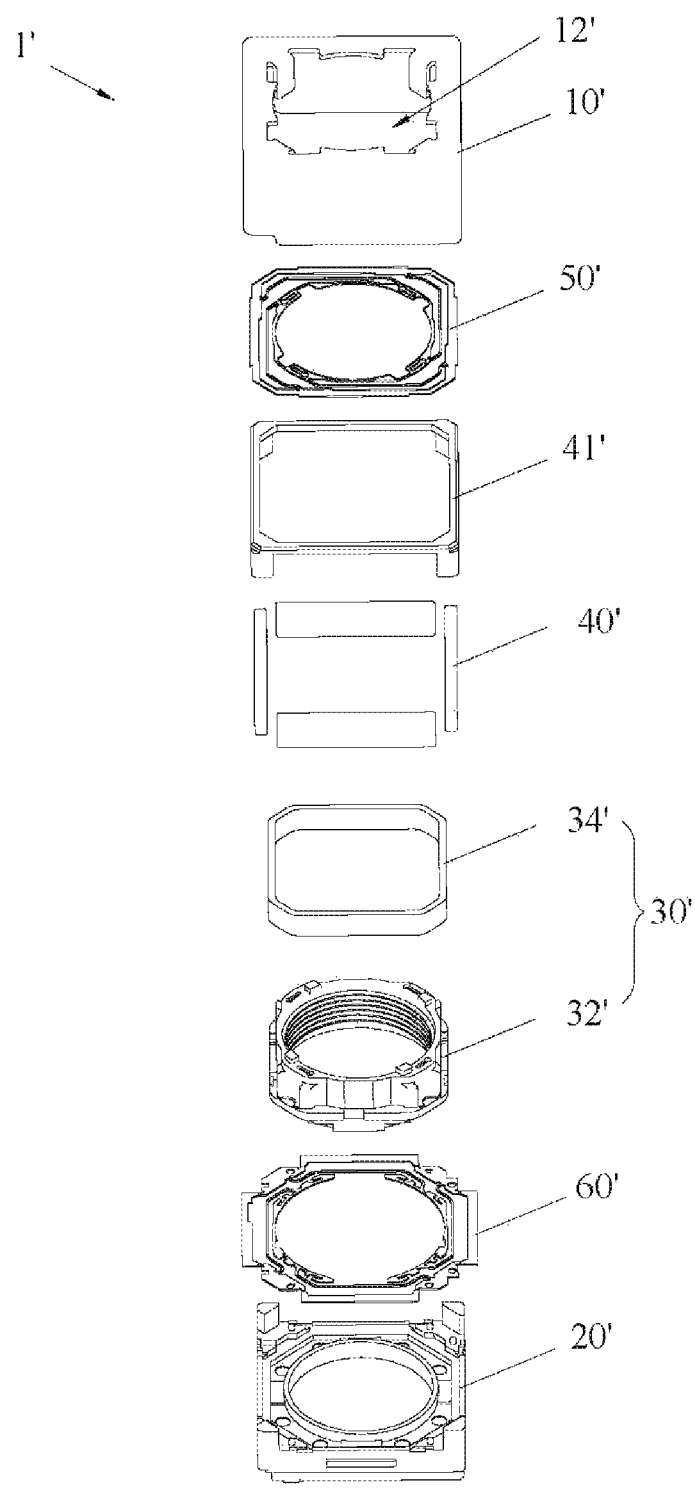
FIG. 1 is an exploded perspective view of a conventional voice coil motor.
Figure 2:
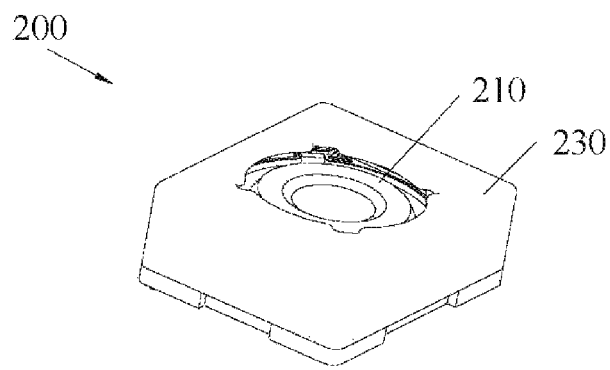
FIG. 2 is a perspective view of an embodiment of the camera module according to the present invention.

A variety of preferred embodiments of the present invention will be illustrated hereinafter in combination with drawings, wherein like reference numerals in different figures indicate like elements. As stated above, the present invention aims to provide a camera module comprising a lens assembly and a voice coil motor assembly, and it is simply structured, easy to assembly, less bulky and fit for the demand of thin products.

Referring FIGS. 1-3a and 3b, a preferred embodiment of the camera module 200 of the present invention comprises a lens assembly 210, a voice coil motor assembly 220 that are assembled integrally, and a housing 230 covering the lens assembly 210 and the voice coil motor assembly 220. The lens assembly 210 is configured for accommodating at least one lens (not shown), the voice coil motor assembly 220 is configured for driving the lens assembly 210 to realize auto-focus, the housing 230 is a yoke; the lens assembly 210, the voice coil motor assembly 220 and the housing 230 are coaxially arranged and respectively provided with a central hole correspondingly. In the present invention, the driving mode of the voice coil motor assembly 220 is moving magnet drive, in which the magnetic field generated by the energized coils drives the magnet to move and thereby the lens assembly is driven to move so as to realize auto-focus.

Figure 3A:
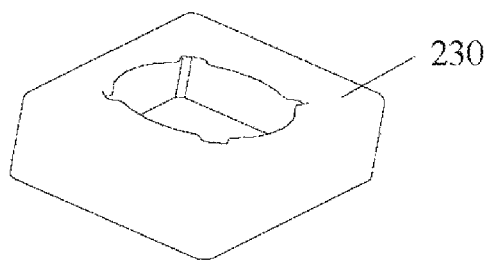
FIG. 3a is a partial exploded perspective view of an embodiment of the camera module according to the present invention.
Figure 3A:
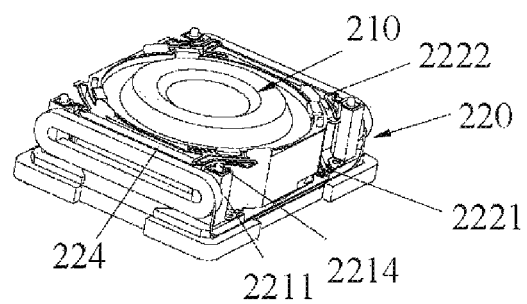
Figure 3B:
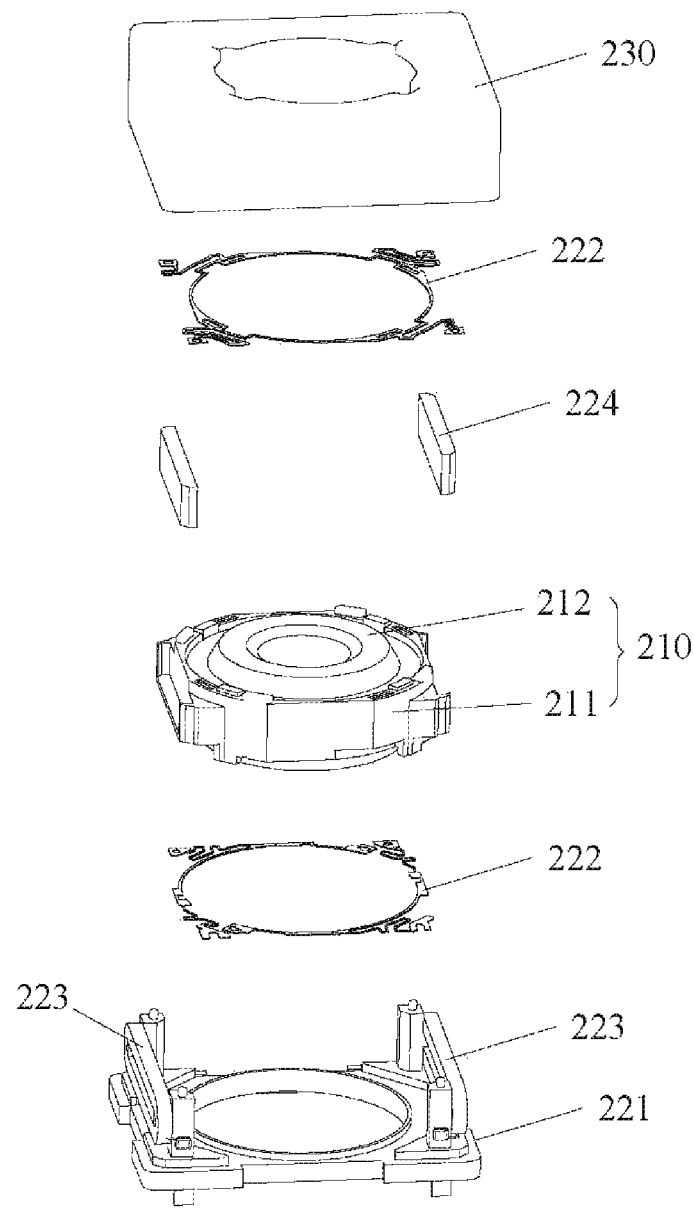
FIG. 3b is a further exploded perspective view of an embodiment of the camera module according to the present invention.

As shown in FIG. 3b, the lens assembly 210 differs from the conventional structure and comprises a lens base 211 and a lens tube 212 within an integral structure, i.e., the lens base 211 and the lens tube 212 are molded integrally and the lenses are arranged in the lens tube 212 with their optical axes aligned. The voice coil motor assembly 220 comprises a base 221, two leaf springs 222, at least two coils 223 and at least two magnets 224. The lens assembly 210 is supported by the base 221, the two leaf springs 222 are respectively arranged on the upper and lower surfaces of the lens assembly 210 and supported by the base. The coils 223 are fixed on the base 221, and the magnets 224 are fixed on the lens assembly 210. The housing 230 covers the lens assembly 210 and the voice coil motor assembly 220 from the top down.

Figure 5A:
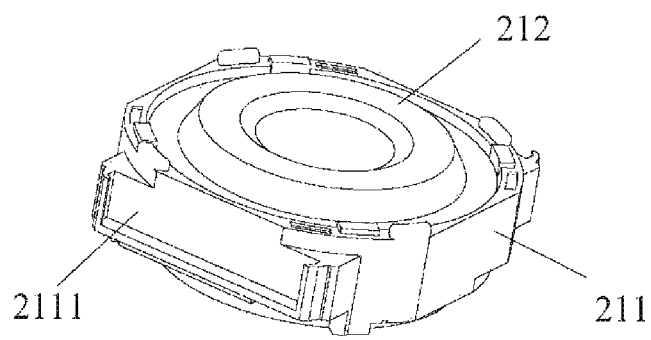
FIG. 5a is a perspective view of the lens assembly of the camera module.
Figure 5B:
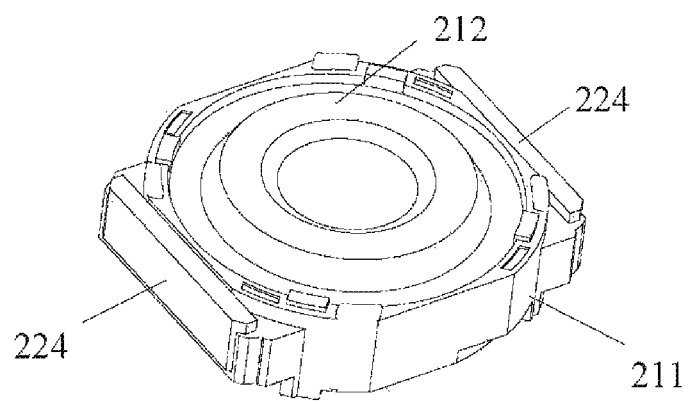
FIG. 5b is a perspective view of the camera module where the lens assembly is assembled with the magnets.

As shown in FIGS. 5a and 5b, a magnet accommodating portion 2111 is configured on each of the two opposite outer sides of the the lens base 211, the magnets 224 are respectively accommodated in the two magnet accommodating portions 2111. Preferably, the magnet accommodating portion is provided with a clamp portion. The magnets are secured on the lens base 211 by the clamp portions so that the lens base 2111, the lens tube and the magnets 224 move together. Preferably, the upper surfaces of the magnet accommodating portions 2111 are lower than the upper surface of the lens base 211, and the upper surfaces of the magnets 224 are substantially level with the upper surface of the lens base 211 when the magnets 224 are clamped in the magnet accommodating portions 2111.

Figure 4:
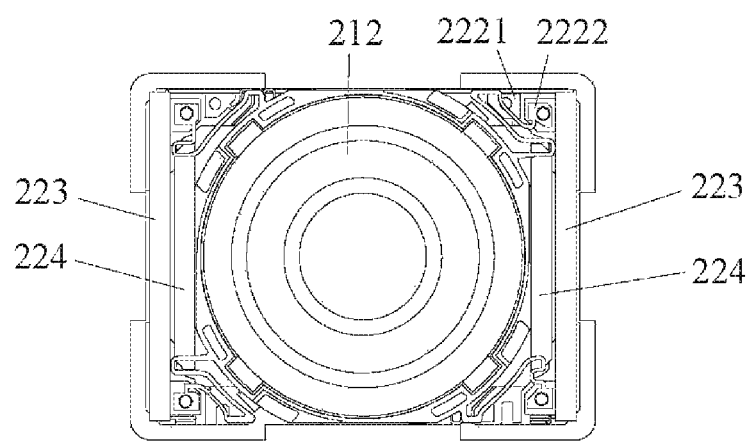
FIG. 4 is a top view of an embodiment of the camera module according to the present invention.
Figure 6A:
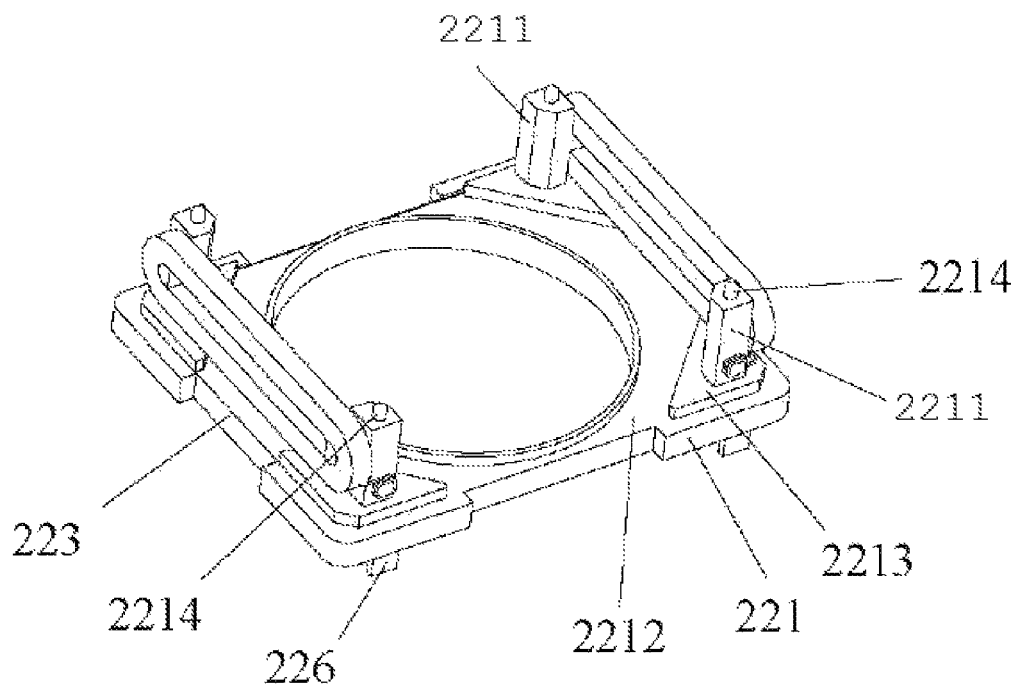
FIG. 6a is a perspective view of the base and coils of the voice coil motor.
Figure 6B:
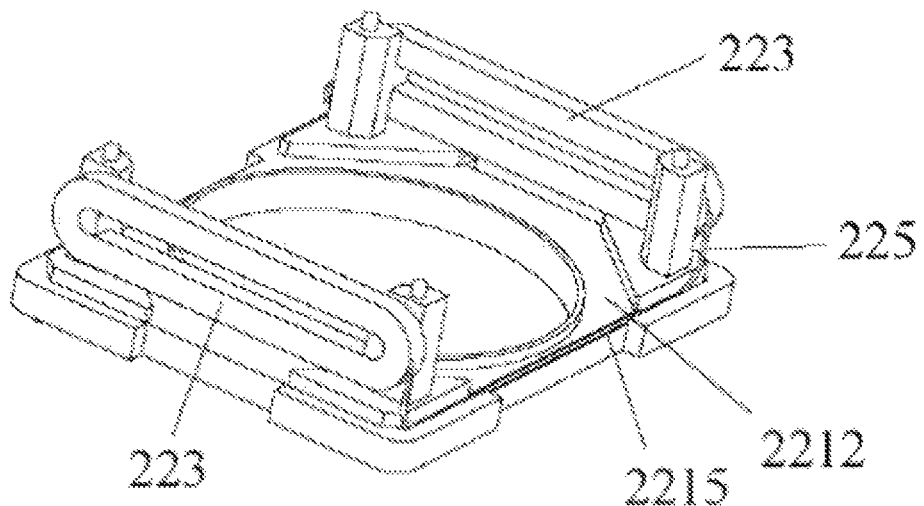
FIG. 6b is another perspective view of the base and coils of the voice coil motor.
Figure 7:
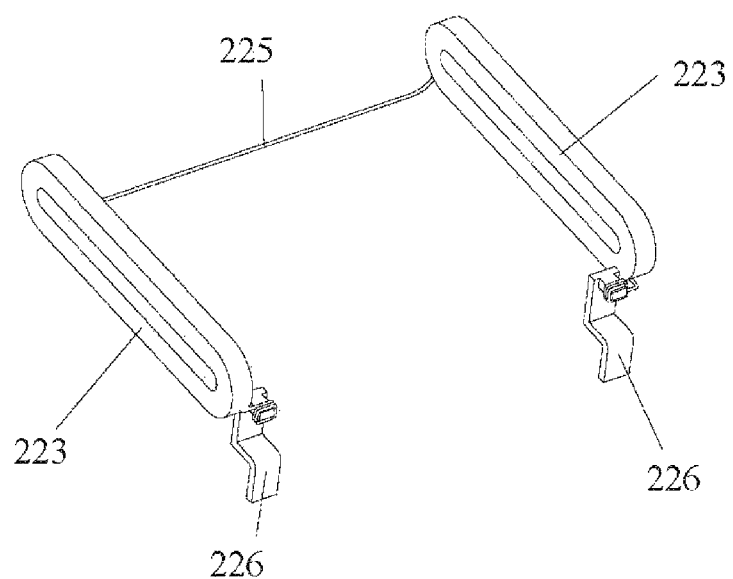
FIG. 7 is a perspective view of the coils of the voice coil motor.

As shown in FIGS. 6a-6b, a plurality of fixed columns 2211 protrude from the surface of the base 2211; preferably, the fixed columns 2211 are arranged in the four corners respectively. Further, the base 221 forms a sunken portion 2212 and step portions 2213. The step portions 2213 are respectively arranged in the four corners, the fixed columns 2211 are fixed on the step portions 2213 and the sunken portion 2212 is sunken relative to the step portions 2213. The lower leaf spring 2221 is arranged on the surface of the base 221. A protrusion 2214 is arranged on the upper surface of each fixed column 2211, the upper leaf spring 2222 partly lies on the fixed columns 2211 and is fixedly attached to the protrusions 2214 via riveting or cementing. A first coil 223 bridges over the two fixed columns 2211 on the same side relative to the first magnet and the first coil 223 is located on the outer side of the two fixed columns 2211 (-away from the central hole). Between the two fixed columns 2211 on the first side and the first coil 223 forms an accommodating room, as shown in FIG. 4, when the lens assembly is mounted on the base 221, the first magnet 224 is located in the accommodating room and adjacent to (but does not contact with) the first coil 223. Likewise, the second coil and the second magnet on the opposite side are arranged in the same way. In particular, the first and second coils 223 on both sides should be energized at the same time, so those coils should be connected. Specifically, a first end of the first coil 223 is connected to a first end of the second coil 223 through a wire 225 (also can be one terminal of the coil), as shown in FIG. 6a, the wire 225 is configured on another side of the base 221. Preferably, the wire 225 is embedded inside the base 221. For example, a groove 2215 is provided in the sunken portion 2212 of the base 221, and the wire 225 is received in the groove 2215 and then is hidden in the surface of the base. The second ends of the first and second coils 223 are fixed respectively on the fixed columns 2211. For example, as shown in FIG. 7, each end of the coil terminal is connected to a pin 226 which is welded fixedly to a fixed column 2211 and protrudes outward through the base 221 for connecting with an external connector so as to supply power to the coil.

As shown in FIG. 3a, the upper leaf spring 2222 and lower leaf spring 2221 are respectively arranged on the upper and lower surfaces of the lens assembly 210, particularly, the lower leaf spring 2221 is supported by the base 221, such as lying on the step portions 2213 of the base 221; the upper leaf spring 2222 lies on the upper surface of the lens assembly 210, specifically, it lies on the peripheral surface of the lens base 221 and partly on the upper surfaces of the magnets 224, connecting holes are disposed on the four corners of the upper leaf spring 2222 for respectively matching with the protrusions 2214 on the fixed columns 2211 by riveting or cementing. That is to say, the upper leaf spring 2222 lies on the lens base 211, the magnets 224 and the fixed columns 2211. Both of the upper and lower surfaces are annular and have flexibility.

The assembling procedure of the camera module of the present invention will illustrated by referring FIGS. 3a, 3b and 4. Firstly, the magnets 224 and then the lower leaf spring 2221 are mounted onto the lens assembly 210 successively, and then the lens assembly 210 and the lower leaf spring 222 are mounted onto the base 221 with the coils 223 fixed thereon in advance, next, the upper leaf spring 2222 is placed on the lens assembly 210 and fixed on the fixed columns 2211 of the base 221, finally, the lens assembly 210 and the voice coil motor assembly 220 is covered with the housing 230; in this way, the camera module 200 is formed. In the assembling procedure of the camera module, the upper and lower leaf springs 222 don't need to be welded together with the base 210, and the assembly of other portions do not need to be achieved by welding except that the terminals of the coils are welded on the side surfaces of the fixed columns 2211 of the base in advance, whereby the assembly thereof is simplified. Nevertheless, the process of connecting the coil 223 to the base 221 in advance is very simple and can be accomplished by injection molding, cementing or clamping, while the fixing between the coil terminal and the pin is preferred to be accomplished by resistance welding or laser beam welding, and the connecting wire between the coils can be embedded in the surface of the base before or after injection molding. It can be seen that the welding processes of the assembly method of the present invention are greatly less than that of the traditional method and thereby the assembly method of the present invention is more simple and convenient. Because the welding positions in width direction of the voice coil motor becomes less, there is no need to reserve room for welding in width direction, the camera module becomes smaller in size and more suitable for the demand of thin products.

Overall, comparing with the prior art, the assembling processes of the lens base 211 and the lens tube 212 is simplified by arranging them in an integral structure. Moreover, the camera module utilizes the moving magnet driving mode where the magnets 224 is fixed on the lens assembly 210, the coils 223 are fixed on the base, and the magnets 224 are located on the inner side of the coils 223, the energized coils 223 drive the magnets 224 and the lens assembly 210 to move. In this structure, the number of components is lessened and the assembly thereof is facilitated, besides, the number of portions need to be weld is reduced and thereby the welding space is saved and the product is further downsized, which acclimates the trend of thin products.

The above disclosed embodiments are merely preferred embodiments of the present invention, and certainly do not limit the scope of the present invention. Therefore, equivalent changes made according to the scope of the present invention for patent application still fall within the scope of the present invention.

What is claimed is:

1. A camera module, comprising:
a lens assembly that includes a lens base and a lens tube integrated with the lens base for receiving at least one lens; and
a voice coil motor assembly for driving the lens assembly that includes a base, an upper leaf spring, a lower leaf spring, at least a first coil and a second coil, and at least a first magnet and a second magnet;
wherein the first and second coils are respectively fixed on two opposite sides of the base, the first and second magnets are fixed on two opposite sides of the lens assembly, and the first and second magnets are located by inner sides of the first and second coils respectively, the lens assembly is clamped by the upper and lower leaf springs and supported on the base, the first and second coils drive the first and second magnets and the lens assembly to move after being energized, and an end of the first coil and an end of the second coil are respectively welded to pins of two of a plurality of fixed columns protruding from a surface of the base.

2. The camera module according to claim 1, wherein each of the coils bridges over two of the plurality of fixed columns and is located at an outer side of the two fixed columns.

3. The camera module according to claim 2, wherein magnet accommodating portions are configured on the two opposite outer sides of the lens base for accommodating the magnets respectively, an accommodating room is formed between the two fixed columns on each of the opposite sides of the lens base, the magnet located on the same side is accommodated in the magnet accommodating portion and adjacent to the coil on the side.

4. The camera module according to claim 2, wherein a first end of the first coil is connected to a first end of the second coil via a wire, a groove is disposed on the base, the wire is embedded in the groove of the base.

5. The camera module according to claim 4, wherein a step portion and a sunken portion are formed on the base, the plurality of fixed columns are secured on the step portion, and the groove is disposed on the sunken portion.

6. The camera module according to claim 1, wherein a protrusion is disposed on each of the plurality of fixed columns, the upper leaf spring is arranged on an upper surface of the lens assembly and connected to the protrusions, and the upper leaf spring lies on the upper surfaces of the magnets partly.

7. The camera module according to claim 1, wherein the second end of the first coil and the end of the second coil are welded on the lateral surfaces of the two fixed columns via the pins and one end of each one of the pins protrudes through the base outwardly.

8. The camera module according to claim 1, wherein the lower leaf spring is arranged on an upper surface of the base.

9. The camera module according to claim 1, wherein a step portion and a sunken portion are formed on the base and the plurality of fixed columns are secured on the step portion.

10. The camera module according to claim 1, wherein the camera module further comprises a housing that covers the lens assembly and the voice coil motor assembly.

* * * * *